US012247826B2

(12) United States Patent
Teodorovic et al.

(10) Patent No.: US 12,247,826 B2
(45) Date of Patent: Mar. 11, 2025

(54) SPECTACLE LENS SHAPE MEASUREMENT METHOD (71) Applicant: Optinno BV, The Hague (NL)

(72) Inventors: Marko Teodorovic, The Hague (NL); Hendrikus Joseph Sebastiaan Basten, Ede (NL)

(*) Notice: Subject to any disclaimer, the term of this patent is extended or adjusted under 35 U.S.C. 154(b) by 351 days.

(21) Appl. No.: 17/827,833

(22) Filed: May 30, 2022

(65) Prior Publication Data

US 2022/0397389 A1 Dec. 15, 2022

Related U.S. Application Data

(60) Provisional application No. 63/209,414, filed on Jun. 11, 2021.

(51) Int. Cl.
| | | |
|---|---|---|
| *G01B 11/02* | (2006.01) | |
| *G01B 11/03* | (2006.01) | |
| *G01B 11/08* | (2006.01) | |
| *G01B 11/24* | (2006.01) | |
| *G06T 7/50* | (2017.01) | |
| *G06T 7/62* | (2017.01) | |
| *G06T 7/73* | (2017.01) | |
| *G02C 7/02* | (2006.01) | |

(52) U.S. Cl.
CPC ............ *G01B 11/24* (2013.01); *G01B 11/022* (2013.01); *G01B 11/03* (2013.01); *G01B 11/08* (2013.01); *G06T 7/50* (2017.01); *G06T 7/62* (2017.01); *G06T 7/73* (2017.01); *G02C 7/02* (2013.01); *G06T 2207/10016* (2013.01); *G06T 2207/30204* (2013.01)

(58) Field of Classification Search
CPC ............ G01M 11/02; G01M 11/0207; G01M 11/0228; G02C 7/021; G02C 13/003; G02C 7/02; G02C 13/005; G01B 11/24; G01B 11/022; G01B 11/03; G01B 11/08; G01B 11/06; G06T 7/50; G06T 7/62; G06T 7/73; G06T 2207/10016; G06T 2207/30204; G06T 2207/30164
USPC ........................................ 356/124, 138, 601
See application file for complete search history.

(56) References Cited

U.S. PATENT DOCUMENTS

| 3,555,739 A | 1/1971 | Novak |
| 5,428,448 A | 6/1995 | Albert-Garcia |
| 6,427,094 B1 * | 7/2002 | Mizuno ................... B24B 9/144 |
| | | 451/42 |
| 6,618,952 B2 | 9/2003 | Andrews et al. |
| 7,448,938 B2 | 11/2008 | Inoguchi |

(Continued)

FOREIGN PATENT DOCUMENTS

FR 2854268 5/2002

*Primary Examiner* — Isiaka O Akanbi (57) ABSTRACT

A method of measuring lens shape of a spectacle lens, the method comprising: a) providing a spectacle lens on a surface; b) providing an image recording apparatus comprising a camera and a display; c) positioning the image recording apparatus so that the camera is largely parallel to the surface; d) capturing an image of the spectacle lens, the captured image comprising a total surface area of a camera-facing side of the spectacle lens; e) indicating positions of features of the spectacle lens in the captured image; and f) measuring a shape of the spectacle lens and determining image coordinates of the spectacle lens features.

15 Claims, 6 Drawing Sheets

(56) References Cited

U.S. PATENT DOCUMENTS

| | | | |
|---|---|---|---|
| 7,628,486 B2 * | 12/2009 | Tanaka | B24B 9/148 |
| | | | 351/159.75 |
| 7,990,531 B2 | 8/2011 | Clements et al. | |
| 8,437,533 B2 | 5/2013 | Kim et al. | |
| 8,467,042 B2 | 6/2013 | Inoguchi | |
| 9,625,743 B2 * | 4/2017 | Levraud | B29D 11/00009 |
| 9,746,833 B2 | 8/2017 | Wen | |
| 9,958,355 B2 | 5/2018 | Ignatovich et al. | |
| 2006/0189255 A1 * | 8/2006 | Akiyama | B24B 9/148 |
| | | | 451/240 |
| 2016/0327814 A1 * | 11/2016 | Marie | G06T 7/62 |
| 2018/0031868 A1 * | 2/2018 | Tadokoro | G02C 7/02 |
| 2018/0106700 A1 * | 4/2018 | Limon | G01M 11/0228 |
| 2019/0049335 A1 * | 2/2019 | Goldberg | G02C 13/003 |
| 2021/0382329 A1 * | 12/2021 | Ohlendorf | G01M 11/0228 |
| 2022/0035183 A1 * | 2/2022 | Glasenapp | G06T 7/73 |
| 2023/0077639 A1 * | 3/2023 | Hamlaoui | G01M 11/0235 |
| | | | 356/124 |
| 2023/0243717 A1 * | 8/2023 | Leube | G01M 11/0257 |
| | | | 356/124 |

* cited by examiner

SPECTACLE LENS SHAPE MEASUREMENT METHOD

BACKGROUND

Production of spectacles, either with corrective ophthalmic lenses and/or light filtering lenses, requires accurate measurement of lens shapes needed to fit inside spectacle frame rims or assembled into rimless spectacles. Ophthalmic and/or light filtering lenses are produced to that exact shape and associated dimensions so that the lenses can be assembled with the spectacle frame to form completed spectacles ready for use.

Different types of lenses can be present in a given spectacle frame. New spectacle frames of any kind are presented with demonstration (demo) lenses which fit the frame in the same manner as a corrective and/or light filtering lens would. Demo lenses are replaced by corrective and/or light filtering lenses needed by a wearer. Previously used spectacles include lenses which the wearer was using, most commonly corrective and/or light filtering lenses. For the purpose of the present disclosure any type of demo, corrective or light filtering spectacle lens associated with a given spectacle frame shall be called a lens.

Lens shape measurement is crucial for production of lenses, which along with other parameters such as monocular pupillary distance, fitting height and spectacle bridge width determine the required lens diameter of the uncut lens. Equally important is the requirement to edge the uncut lens to the exact shape needed to assemble the spectacles. Spectacles are assembled by glazing the lenses into the frame rims, or by drilling appropriate drill holes in the lenses and fastening the lenses to the temple hinges and the bridge in case of rimless spectacle. If the lens is made to incorrect diameter, shape and/or dimensions it would be impossible to assemble the spectacles or there would be undesirable gaps between the spectacle frame and the lens, as well as unintended optical and/or aesthetic effects.

Presently, apparatus called a tracer is most commonly used to measure the lens shape. Most used type of a tracer is of a mechanical type which uses a probe which traces the rim inner groove in which the lens is inserted during assembly, and/or the edge of the lens in case of rimless or the lens groove for half-rimless spectacles. One such apparatus is described in U.S. Pat. No. 3,555,739. A more modern tracer uses a video camera to capture the lens image and extract the lens shape from it, such as described in U.S. Pat. No. 9,743,833 B2. Tracers transmit the lens shape data output to production systems and/or a standalone edging apparatus, based on which lenses are produced and/or edged so as to be ready for assembly of spectacles.

The disadvantage of currently available tracers is that they are costly purpose-built devices made by different manufacturers, which are difficult to operate in conjunction with equipment from a different manufacturer. Moreover, the mechanical tracers, which are the most common type, need to be regularly calibrated and maintained to ensure accurate measurements.

SUMMARY

In a first embodiment of the present disclosure, a method for measurement of lens shape includes:

a) providing a lens associated with a corresponding spectacle frame,
b) drawing an axis line on the lens,
c) providing an image background,
d) providing an image recording apparatus with an interactive display screen,
e) positioning the lens on the image background by aligning the axis line drawn on the lens with a horizontal line on the background,
f) positioning the image recording apparatus in such a way so as to capture an image wherein the entire image background with the lens placed on top of it is visible,
g) capturing the image described in step f,
h) displaying the image captured in step g on the image recording apparatus display screen,
i) indicating lens marking points on the image recording apparatus interactive display screen and recording their positions and/or coordinates in the image,
j) determining the lens shape and its dimensions using computer vision routines, and recording them in a format ready for a lens production system and/or edging apparatus, including coordinates of lens marking points.

According to an embodiment, an image recording apparatus, such as a smartphone or a tablet computer, is a system which includes at least the elements of: a camera, display screen, user interface, computational hardware and means for data communication.

An embodiment of the present disclosure comprises the image recording apparatus which includes sensors to determine orientation of said apparatus in space along all three axes, and which can display and record spatial orientation information. Spatial orientation sensors and displaying their measurements aid in positioning the image recording apparatus prior to capturing the image. Optionally, recorded spatial sensor data is used in computer vision routines used to measure the shape of the lens and lens marking points coordinates in the captured image. Additionally, the image in step g) is optionally captured when the spatial orientation sensors' output indicates that the image recording apparatus is in a largely horizontal position with the camera pointing downwards and/or the image background is present in the video feed.

According to a further embodiment an image recording apparatus with additional sensors for spatial scanning and measurement is used. Spatial scanning sensors may employ electromagnetic and/or sound waves to accurately determine the position of the lens in relation to the image recording apparatus, as well as scan and measure its features. Such sensors commonly use LIDAR and/or time-of-flight technology. In this embodiment an image background is unnecessary as data required for the computer vision routines used in lens measurement is available from spatial scanning sensors of the image recording apparatus.

An embodiment of the present disclosure is an image recording system comprising a first electronic device with at least one camera and/or sensors, a second electronic device with a display screen and user interface, and a third electronic device with computational hardware. The second and third devices may be the same or separate devices. In one example, the first device used to capture an image may be smartphone or tablet computer. The captured image may then be sent to another device, such as an external server, that is separate from the first device. A user may then download the captured image from the server onto another electronic device, such as a personal computer (PC), and then perform measurement calculations of the captured image on the computer. Alternatively, a user may use the user interface of a second electronic device, such as a tablet or a personal computer, to send input(s)/data regarding the captured image to a third electronic device, such as a server with computational hardware, on which measurement computations are performed. In any case, each device is configured to communicate data, directly or indirectly, with all of the other devices of the system. In this embodiment the system performs the functions of the image recording apparatus.

Another embodiment of the system, comprises a movable surface on which the lens is placed, such as a conveyor belt, with or without the image background placed on top of the surface. When the lens reaches a position in which a camera is directly overhead of the lens, an image of the lens is captured with or without respective spatial scanning sensors' readings. Next, lens marking points are indicated on the image recording apparatus interactive display screen and their coordinates in the image are recorded. Finally, the lens shape is determined and its dimensions using computer vision routines and recording them in a format ready for a lens production system and/or edging apparatus, including coordinates of the lens marking points.

According to a further aspect of the disclosure, an image recording apparatus comprises a computer with a user interface; and a non-transitory computer readable program for causing the computer to perform the following steps when executed: displaying the lens on the display screen; instructing the user to position the image recording apparatus as described in f); instructing the user to record the image or optionally performing step g) automatically when given parameters, such as the coordinates of computer readable markers in the image, are satisfied; and using computer vision routines to measure the lens shape and its dimensions. Optionally, the measured lens shape and/or spatial sensor data can be transmitted to another device and/or system specified by the user in the user interface.

According to a further embodiment, the image of the spectacle lens perimeter is captured by drawing the outline of the lens or inside spectacle rim perimeter directly on the image background with a writing utensil such as a pen. Next, step f) and subsequent steps are performed.

In addition, it is foreseeable that any of the aforementioned embodiments may be implemented in combination with or via a non-transitory computer-readable storage medium. The non-transitory computer-readable storage medium may execute a program or cause a computer or similar device configured to execute a program in accordance with any of the aforementioned embodiments and/or method steps described herein. Further, the non-transitory computer-readable storage medium may be stored locally or provided via an external source or device.

BRIEF DESCRIPTION OF THE DRAWINGS

The present disclosure will be discussed in more detail below, with reference to the attached drawings, in which.

DETAILED DESCRIPTION

Figure 1:
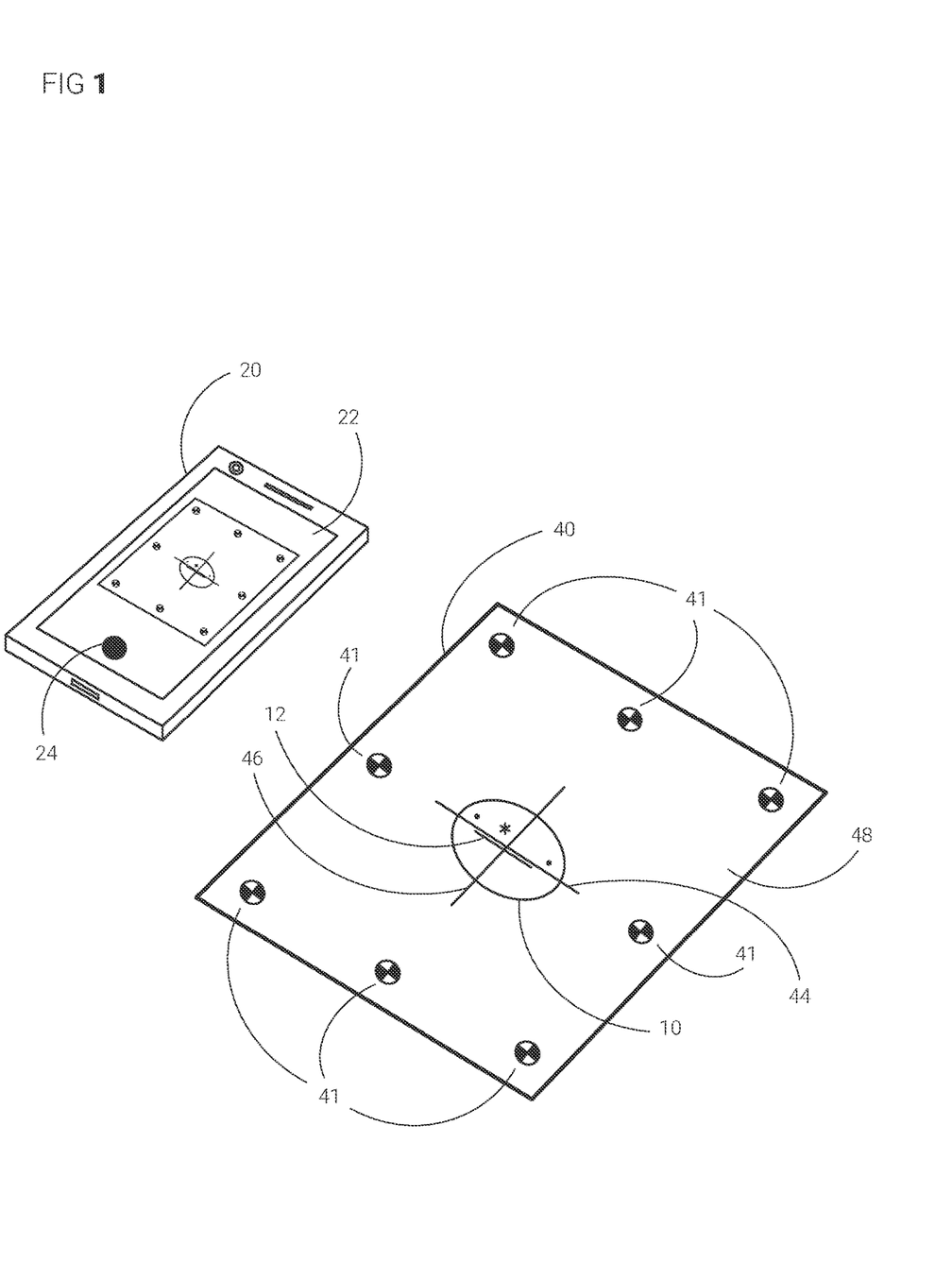
FIG. 1 shows an image recording apparatus in image capture position of a lens placed on an image background.
Figure 4:
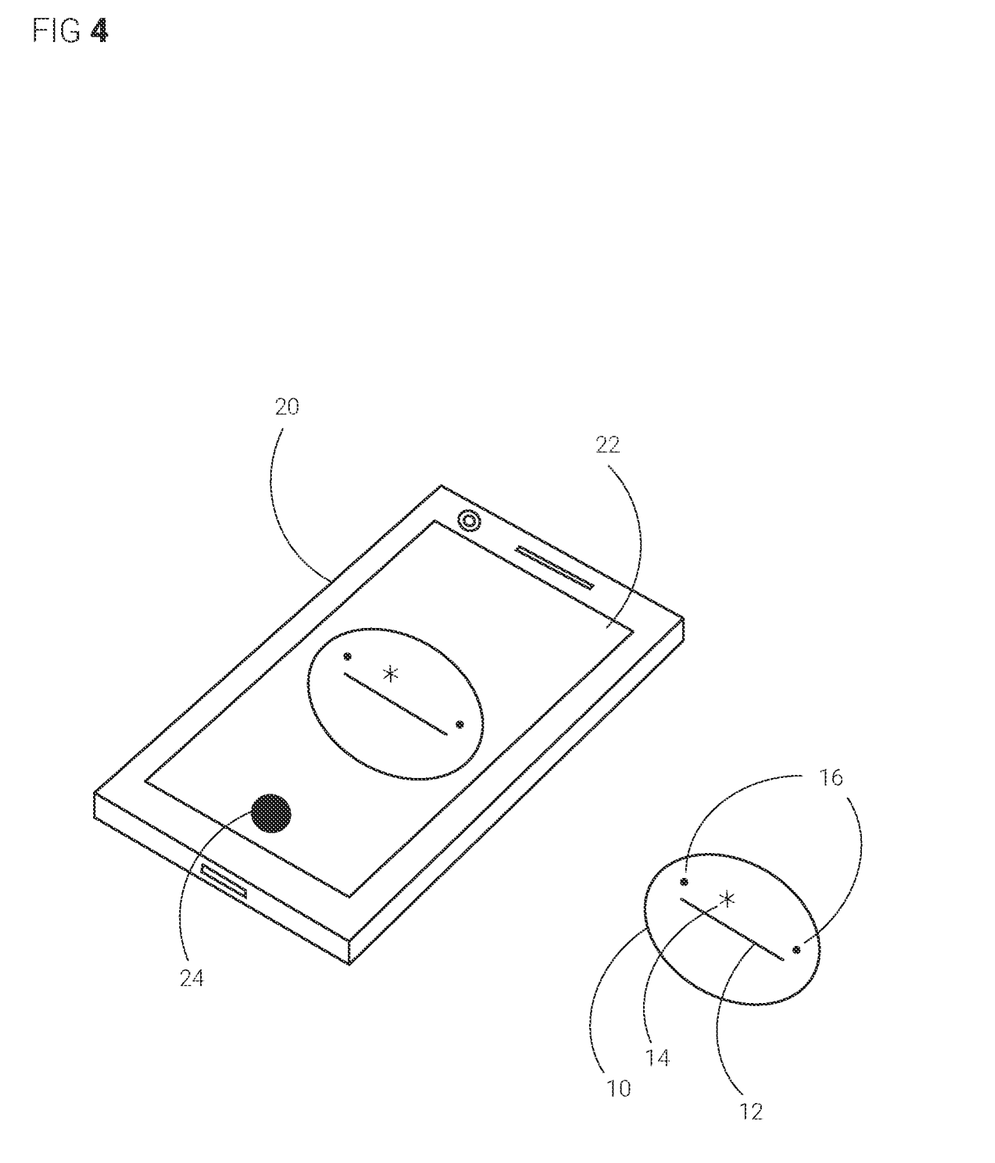
FIG. 4 shows image recording apparatus in image capture position of a lens without image background.

FIGS. 1 and 4 show positioning the image recording apparatus 20 in relation to the lens 10 which is being measured. Image recording apparatus 20 is largely parallel to a surface on which the lens 10 is placed. Surface on which the image background and/or lens is placed is for example a table, a workbench, a shelf or conveyor belt, which is substantially parallel to the horizontal plane perpendicular to the gravity vector.

Image recording apparatus 20 camera 26 is aimed towards the central portion on the lens 10 using the real-time video feed shown on the image recording apparatus 20 display screen 22.

Image recording apparatus 20 is a handheld electronic device, for example, a smartphone, a tablet computer or other handheld device which is capable of capturing an image, has an interactive display screen, computational hardware, and typically has spatial orientation sensors such as gyroscopes and accelerometers as well as a microphone and a sound speaker. The image recording apparatus 20 can include a computer system, software, an application and/or other configuration to perform at least one or more steps of method 100 shown in FIG. 6.

FIG. 1 also shows an image background 40, which is placed on the surface prior to placing the lens 10 on the image background 40 before capturing an image with the image recording apparatus 20. Image background 40 is made of printed medium made from paper, cardboard, plastic or other printable material, and is printed with a predetermined pattern of computer readable markers 41, within an area 48, horizontal line 44 and vertical line 46. All the above-mentioned elements of the predetermined printed pattern of the image background 48 can be represented in various colors for aiding the measurement process and/or aesthetic reasons. The purpose of the image background 40 is to provide data needed by computer vision routines to measure a lens, such as scale of the image, position of the image capture apparatus 20 in relation to the image background 40, orientation and positioning of the lens 10 and providing image contrast. In particular, predetermined placement of computer readable markers 41 enable computer vision routines to perform above mentioned measurements.

Figure 2:
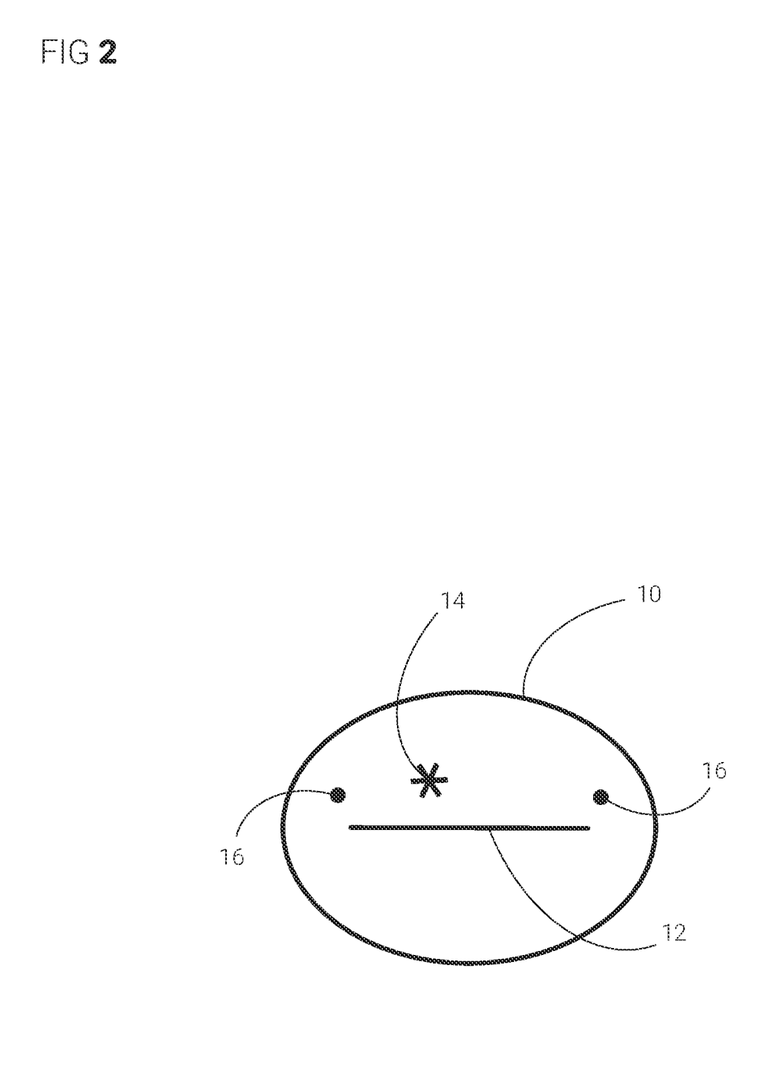
FIG. 2 shows a close-up view of the lens with an axis line and lens marking points.

In FIG. 2 the lens 10 is shown in detail, and represents either left- or right-hand side lens of an associated spectacle frame. The lens 10 shows an axis line 12, which is drawn by the user and is a line parallel to the line that bisects both spectacle lenses height-wise. The purpose of the axis line 12 is to determine appropriate orientation of the measured shape of the lens 10. Optionally, axis line 12 is omitted and lens orientation is determined by other methods, such as analyzing lens shape image with lens shape with a known orientation for example as specified in technical drawings of the associated spectacle frame. Additionally, FIG. 2 shows lens marking points: centering point 14 and drill holes 16. Centering point 14 indicates the center of the pupil of the wearer while wearing spectacles and is used in lens and/or spectacle manufacture. It is a user-made mark on the lens, placed there with a writing instrument such as a permanent marker, or a virtual point defined by coordinates relative to the spectacle frame entered by the user in the appropriate part of the user interface of the image recording apparatus 20. Drill holes 16 are only present when the lens 10 is associated with rimless spectacles, and are used to assemble the said rimless spectacles by fastening the lenses with the spectacle bridge and temples.

Figure 3:
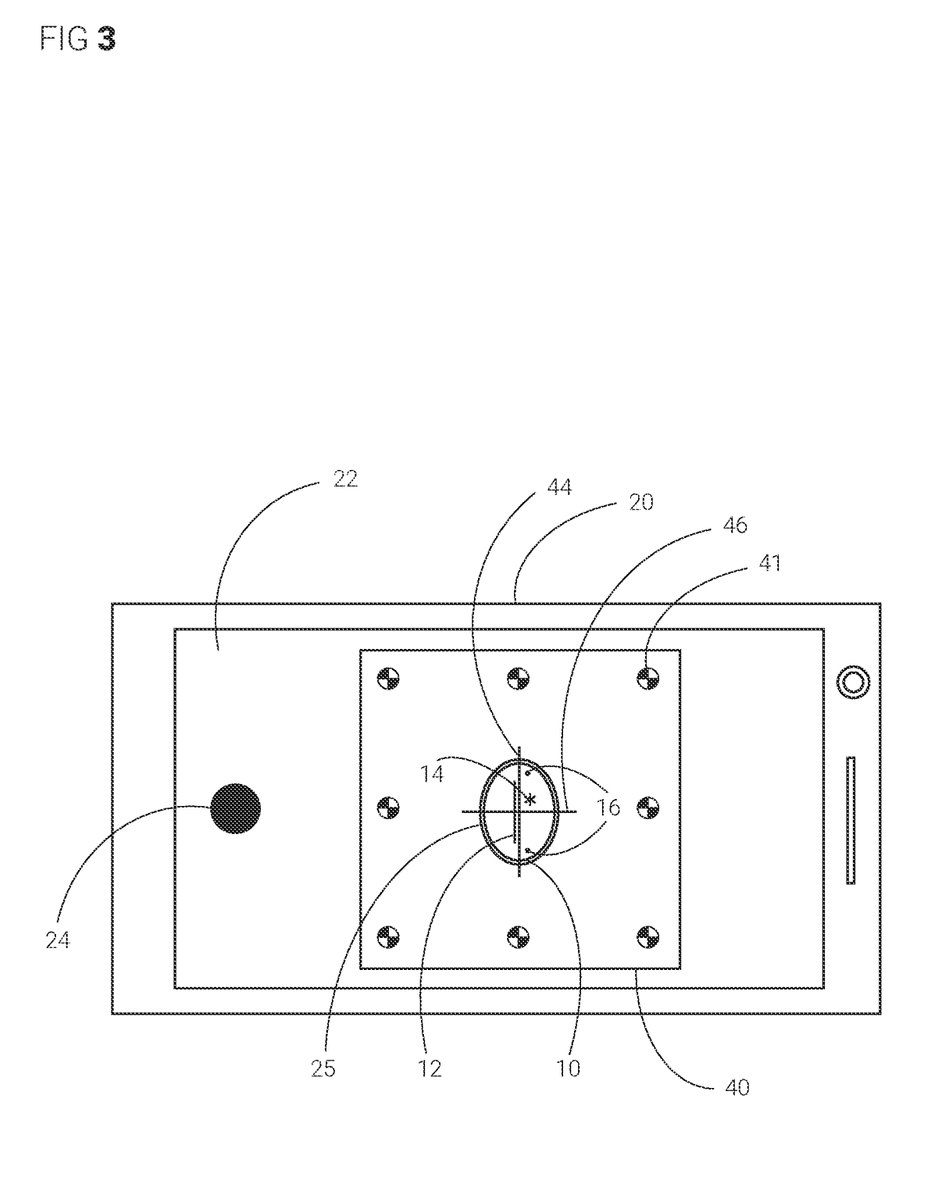
FIG. 3 shows the frontal side of the image recording apparatus.
Figure 5:
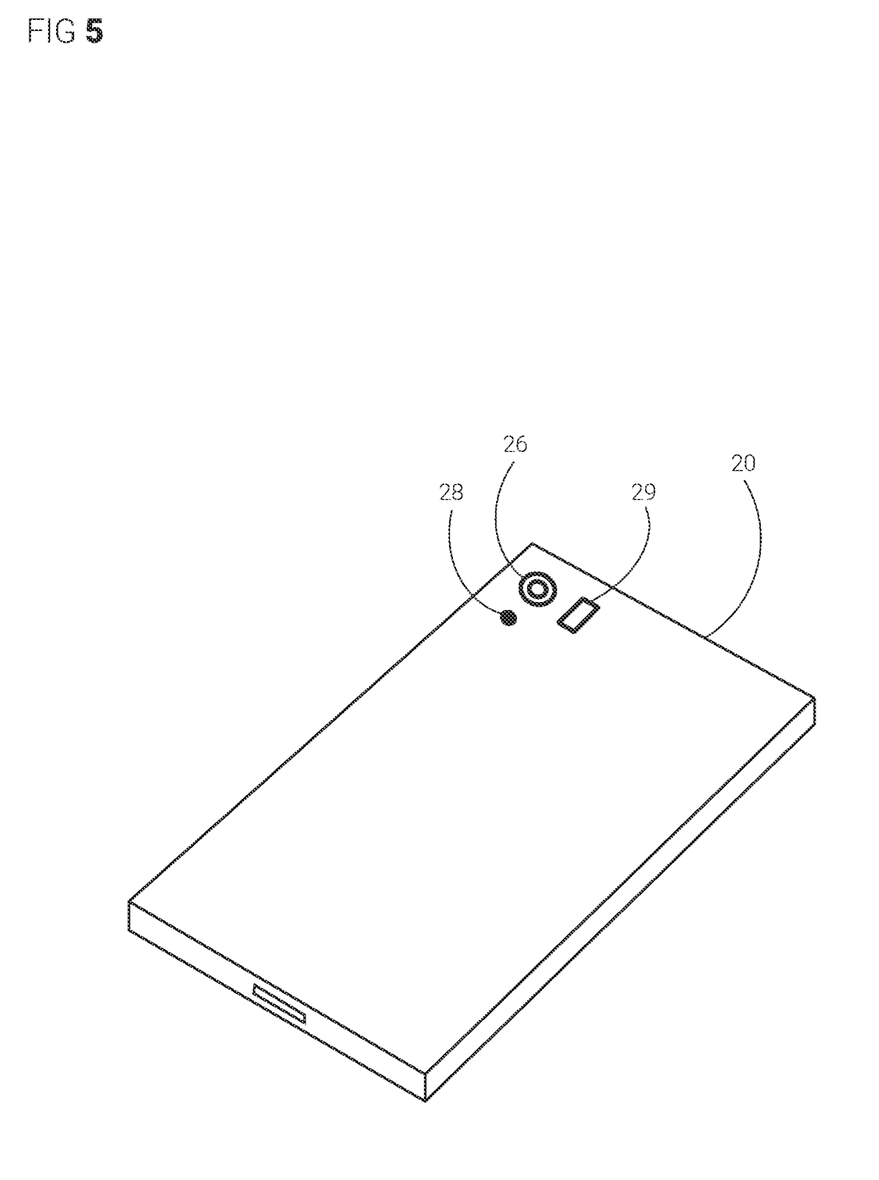
FIG. 5 shows the back side of the image recording apparatus.

FIGS. 3 and 5 show details of the image recording apparatus 20. In FIG. 3 front side of the image recording apparatus 20 is shown, depicting the display screen 22 and an image capture icon 24. Back side of the said image capture apparatus 20 is shown in FIG. 5. Including the camera 26, spatial scanning sensor 28 and illumination component 29. Spatial scanning sensor 28 may employ electromagnetic and/or sound waves to accurately determine the position of the lens 10 in relation to the image recording apparatus 20, as well as scan surface of the lens 10. Illumination component 29 may be a LED light which is used to enhance light conditions during image capture process described in step 106 of process 100 depicted in FIG. 6.

Optionally, the camera 26 and the spatial scanning sensor 28 are part of an attachment fitted to the image recording apparatus 20. Data connection between such an attachment is established by a physical data connection or via wireless data communication.

A preferred embodiment of the present disclosure is shown in FIG. 1. The lens 10 is placed on the image background 40 above which the image recording apparatus 20 is positioned at a typical distance of about 10 to 20 cm from and largely parallel to the image background 40 with the camera 26 facing downwards. The image background is preferably placed on the surface. The lens 10 is placed on the image background 40 so that the axis line 12 aligns with and overlaps the horizontal line 44, while the vertical line 46 approximately bisects the lens 10 width-wise.

In a preferred embodiment, image recording apparatus 20 camera 26 is aimed at the lens 10 resting on the image background 40 so that the entire surface of area 48 of the image background is shown on the display screen 22 via real-time video feed from camera 26. It is desirable for the image background area 48 to fill the whole display screen 22 symmetrically, and in particular with respect to the width of display screen 22. Optionally, the image apparatus 20 contains data output from one or more spatial orientation sensors (not shown), which aid the user in correct aiming of the camera 26. In this regard, the data output from the one or more spatial orientation sensors can be used to provide visual and/or audio guidance instructions to the user.

Once the image recording apparatus 20 is positioned correctly the user captures the image by tapping the image capture icon 24 on the display screen 22. Alternatively, image capture is performed by the user giving a voice command recorded by the image recording apparatus microphone (not shown) instead of tapping the image capture icon 24. Optionally, the user indicates the positions of one or more lens features: the axis line 12, the centering point 14 and drill holes 16 in the captured image displayed on the interactive display screen 22 thus indicating their coordinates in the captured image.

Next, the captured image is analyzed employing computer vision routines by the computational hardware of the image recording apparatus 20 measuring the shape of the lens 10. One or more measurements are made at the conclusion of the aforementioned analysis, such as geometrical shape of the lens 10, length of its perimeter, its height and width, and coordinates of the lens marking points.

In an embodiment, image capture is performed automatically by the image recording apparatus 20 without user input by computational analysis of the real-time video feed recorded by the camera 26, triggering image capture once image background 40 fills the screen width-wise and all computer readable markers 41 are visible. Optionally, data from spatial orientation sensors of the image recording apparatus 20 are included in the criteria used to trigger image capture in order to increase accuracy of the captured image and lens shape measurement.

In an embodiment, a number of images of the lens 10 placed on the image background 40 are taken with the purpose of computing a 3-dimensional representation of the lens 10. The number of images taken may be any positive integer, including but not limited to, 1, 2, 3, 4, 5, 10 or more images. The 3-dimensional representation may enable or facilitate more accurate measurement(s) of the lens 10. In addition to the default position of the image recording apparatus 20 being placed largely parallel to the surface of the image background 40, the image recording apparatus may be placed in at least one additional position in relation to the intersection of horizontal line 44 and vertical line 46. These additional positions can include positioning: above the intersection along the vertical line 46, below the intersection along the vertical line 46, left of the intersection along the horizontal line 44, and right of the intersection along the horizontal line 44. For all of the above-mentioned additional positions, the aiming point of the camera 26 is the intersection of horizontal line 44 and vertical line 46. In this regard, the image recording apparatus 20 is not positioned largely parallel to the image background.

FIG. 3 shows verification of the lens shape measurement. Here, the user is presented with the captured image with an overlay 25 of the lens shape perimeter drawn on the display screen 22 from the output generated by computer vision routines analyzing the lens 10. Next, the user compares overlay 25 of the lens shape with the image of the lens 10. If they align, the user completes the measurement process by tapping the image capture icon 24 and/or giving a voice command recorded by the image recording device microphone. Otherwise, the process of image capture, lens shape measurement and analysis is repeated.

In an embodiment, comparison of the lens shape overlay 25 with the image of the lens 10 can be done computationally on the image recording apparatus 20 or on another device by analyzing the gap in the captured image between the overlay 25 and the image of the lens 10. Optionally, other methods of image analysis, such as statistical analysis of multiple captured images' lens perimeters and associated overlays, may be used to compare the shape and dimensions of the overlay 25 and the lens image 10 to verify the output generated by computer vision routines. Optionally, image capture icon 24 enables transfer of the captured image, spatial orientation sensors' data, and/or lens shape measurements to a computer system selected by the user in a format selected by the user in the user interface, such as data file formats used by various lens ordering and/or production systems. This data is transmitted by means of an email or other type of electronic message sent to an email address or other type of electronic inbox and/or computer system. The communication and data transfer between image recording apparatus 20 and other computer devices and/or systems can be through a network data connection, or through a wireless data connection.

As shown in FIG. 4, the lens 10 is placed on the surface without the image background 40. Data provided by the image background 40, and in particular the position of the lens 10 relative to the image recording apparatus 20, is instead determined computationally from data provided by the spatial scanning sensor 28 of the image recording apparatus 20. In this case, the time electromagnetic and/or sound wave traveling from and reflected back to the spatial scanning sensor 28 is measured, and this measurement is then used to calculate the distance.

Optionally, the data collected by the spatial scanning sensor 28 upon a full scan the surface of the lens 10 is used to construct 3-dimensional digital model of the lens 10 used for more precise measurement of the lens shape, thickness and calculation of the corrective power of the lens 10. For measurement of the corrective power of the lens 10, at least one image of the lens 10 with the concave side facing the camera 26 and at least one image of the convex side facing the camera are taken. Corrective power is calculated by comparing the 3-dimensional shapes of the convex side with the concave side, thereby determining precise lens thickness over its entire surface. Several images of the lens 10 may be captured along with corresponding spatial scanning data in order to increase measurement precision.

The orientation of the lens 10 may be established by user input indicating the position of the axis line 12 in the captured image. Alternatively, the position of the axis line 12 can be determined computationally using computer vision routines on the captured image without the need for user input by analyzing the image of the lens surface for a line drawing.

Figure 6:
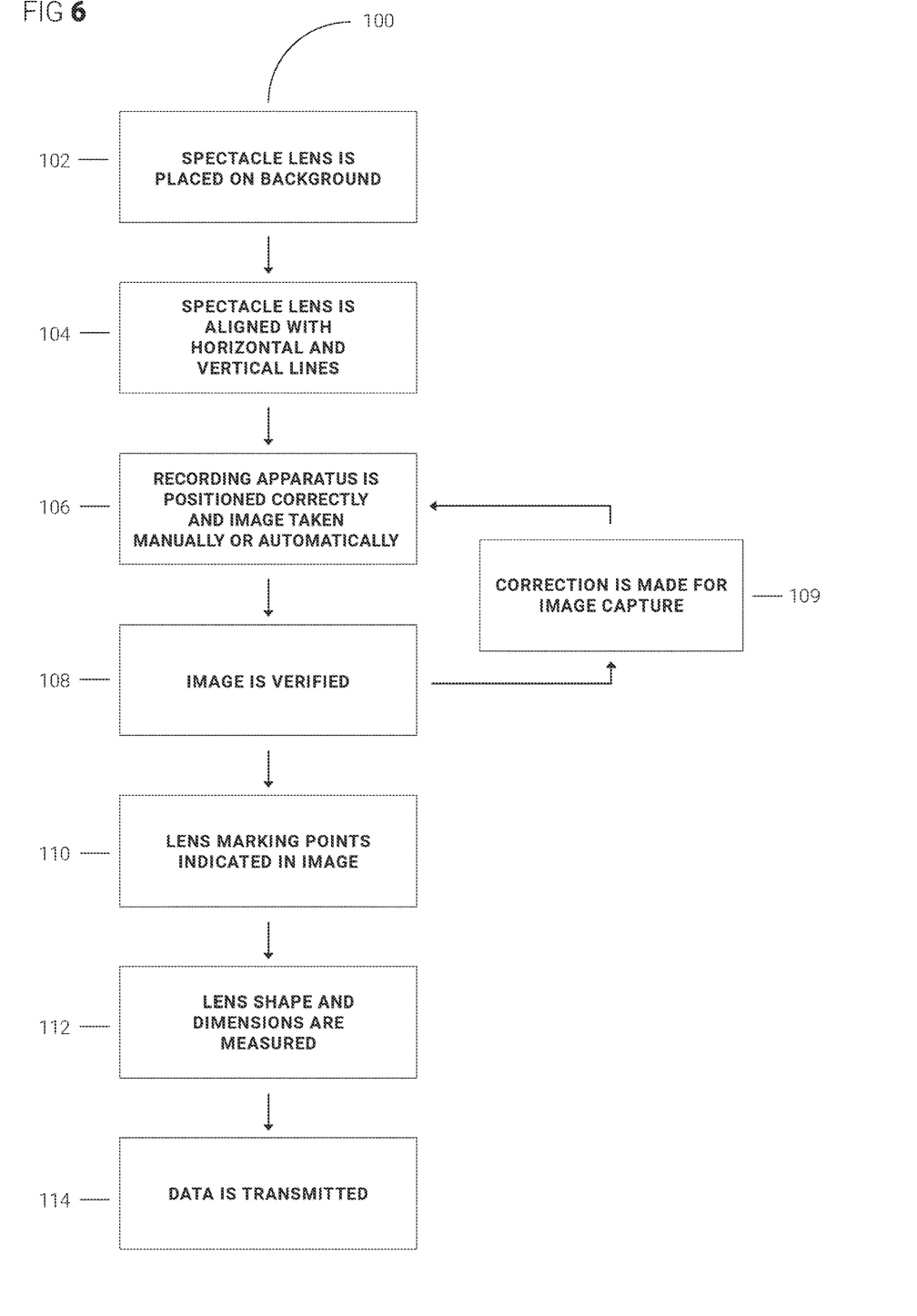
FIG. 6 shows a flow chart depicting a process of measuring lens shape.

FIG. 6 shows a method 100 of steps, which are discussed in relation to FIGS. 1-5:

Step 102: Placement of the spectacle lens on the image background.

The lens is placed in the middle of the image background 40. In other embodiments, the lens may be placed on the surface without the image background as shown in FIG. 4. Preferably, the lens is provided with an axis line prior to positioning on the image background, though it is foreseeable that the axis line could be provided on the lens after it is positioned on the image background.

Step 104: Alignment of the spectacle lens with horizontal and vertical lines.

The lens 10 is aligned with the image background 40 so that axis line 12 overlaps with the horizontal line 44 while the vertical line 46 approximately bisects the lens widthwise as shown in FIG. 1. For an embodiment such as one shown in FIG. 4, this step may be skipped.

Step 106: Positioning of the image recording apparatus and image capture.

In this step, the user positions the image recording apparatus 20 so that the image background 40 fills the screen, as shown in FIG. 1, and taps the image capture icon 24 or gives a verbal command to capture the image. Optionally, this process can be aided by data from spatial orientation sensors. In an embodiment, image capture may be performed automatically without user input, triggered by video feed and/or sensor data analysis.

Step 108: Image verification.

In this step the user performs a visual inspection of the captured image as shown in FIG. 3. Optionally, this step can be performed automatically by analyzing the image using computer vision routines without user input. If the image satisfies predetermined criteria as described herein, such as when the image background fills the screen width-wise and all of the computer readable markers are visible in the image, the process proceeds to step 110; or when the predetermined criteria are not satisfied, the process instead proceeds to step 109.

Step 109: Repositioning of the image recording apparatus.

The user repositions the image recording apparatus so that lens is aligned with background image and/or background image fills the entire screen on the image recording apparatus.

Step 110: Indication of lens marking points on the lens.

The user indicates the lens marking points on the captured image shown on FIG. 3. At least one lens marking point is indicated, but any number of marking points can be indicated. If no lens marking points are present this step may be skipped.

In an embodiment, the centering point 14 is indicated by user entry of image and/or frame coordinates on the image recording apparatus. In an embodiment, the user indicates the position of the axis line 12 in the captured image.

Alternatively, step 110 may be performed automatically without user input by computer vision routines analyzing the captured image.

Step 112: Measurement of lens shape and dimensions.

This step is performed computationally by computer vision routines, the output of which may include a geometrical shape of the lens, a lens perimeter length, a lens height, a lens width, and/or a lens diameter. Optionally, coordinates of the lens marking points and/or axis line in the captured image are measured. In an embodiment, step 112 is performed by a computational device, separate from the image recording apparatus 20, based on recorded data electronically sent from the image recording apparatus to the computational device.

Step 114: Data transmission.

All or part of the data relating to the measurements and/or the measurements themselves may be transmitted by the user from the image recording apparatus to a separate computer system or other electronic device such that lens and/or spectacle manufacture may proceed; in the alternative the data may be automatically transmitted between the electronic devices.

While the present disclosure has been described with reference to exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular or preferred embodiments disclosed, but that the present disclosure will include all embodiments falling within the scope of the appended claims.

The invention claimed is:

1. A method of measuring a spectacle lens, without spectacle frame which otherwise obscures lens edge, using a printed image background comprising a predetermined area and colors with a predetermined pattern and colors of computer readable markers providing scale and relative position data, as well as contrast needed for measurement by computer vision routines, the method comprising:
    a) Placing a spectacle lens on the said image background;
    b) Capturing an image of the spectacle lens and the said image background;
    c) Using computer vision routines on the captured image to measure at least one of the entire shape of the spectacle lens, its dimensions and its features;
    d) Recording the measurements in a format ready for a lens production system and/or an edging apparatus.

2. The method of claim 1, wherein the image background comprises intersecting horizontal and vertical lines in a defined central area of the said image background aiding in positioning and image capture of the spectacle lens.

3. The method of claim 2, wherein at least one image is captured in relation to the intersection of the horizontal and vertical lines, directly above the intersection, above the intersection along the vertical line, below the intersection along the vertical line, left of the intersection along the horizontal line, or right of the intersection along the horizontal line.

4. The method of claim 1, wherein in step b), image is taken at a distance of 10 to 20 cm from the spectacle lens so that the said image background fills the entire captured image.

5. The method of claim 1, wherein the shape of the spectacle lens is measured by drawing an outline of a perimeter of the lens directly on the said image background or by tracing an outline of an inner rim perimeter of a spectacle frame adapted to fittingly hold the spectacle lens therein directly on the said image background, and subsequently capturing an image of the outline of the perimeter of the lens or the outline of the inner rim perimeter in step b).

6. The method of claim 1, wherein the spectacle lens measuring of step c) comprises determining one or more of a perimeter length, geometric shape, lens height, lens width, and thickness of the spectacle lens.

7. The method of claim 1, wherein the features of the spectacle lens comprise one or more of a user-drawn axis line used to establish the precise orientation of the measured shape, a user-made pupil centering point and at least two drill holes, each feature being measured in relation to the lens shape determined in step c).

8. The method of claim 1, wherein method step b) is repeated to provide a plurality of captured images of the spectacle lens, whereby a three-dimensional representation of the spectacle lens is generated from/based on the plurality of captured images thereby enhancing the accuracy of the measurements performed in step c).

9. The method of claim 1, wherein step b) is performed by an image recording apparatus containing spatial orientation sensors readings of which are used to either guide the user in capturing an image or aid in automation of image capture, and/or are recorded in step b) and said sensors' data used additionally in step c) to enhance measurement accuracy.

10. A method of measuring a spectacle lens, without a spectacle frame which otherwise obscures the lens edge, using an image recording apparatus comprising a camera, a display, and at least one spatial scanning sensor configured for accurate surface scanning and determining the relative position of the spectacle lens, the method comprising:
 a) Placing a spectacle lens on a surface and positioning the image recording apparatus at a predefined distance, typically between 10 and 20 cm, from the lens to ensure complete lens coverage;
 b) Performing a spatial scan of the entire spectacle lens with the image recording apparatus, or performing a combined spatial scan and capturing an image of the lens using the camera;
 c) Using the spatial scanning data, either independently or in combination with computer vision routines applied to the captured image, to accurately measure at least one of the entire shape of the spectacle lens, its dimensions and its features;
 d) Recording the spatially accurate measurements in a format compatible with lens production systems and/or edging apparatus.

11. The method of claim 10, wherein the image recording apparatus comprises at least one spatial orientation sensor which records spatial orientation data in step b).

12. The method of claim 11, wherein spatial orientation data is additionally used in step c) to enhance measurement accuracy.

13. The method of claim 10, wherein the measuring of step c) comprises determining one or more of a perimeter length, geometric shape, lens height, lens width, and thickness of the spectacle lens.

14. The method of claim 1, wherein the features of the spectacle lens comprise one or more of a user-drawn axis line used to establish the precise orientation of the measured shape, a user-made pupil centering point and at least two drill holes, each feature being measured in relation to the lens shape determined in step c).

15. The method of claim 1, further comprising determining the corrective power of the lens by performing steps a) to c) for both the convex and concave sides of the lens, wherein each side is measured multiple times as needed, and the three- dimensional shapes of both sides are compared to accurately determine the precise thickness of the lens across its entire surface.

* * * * *